Figure 1:
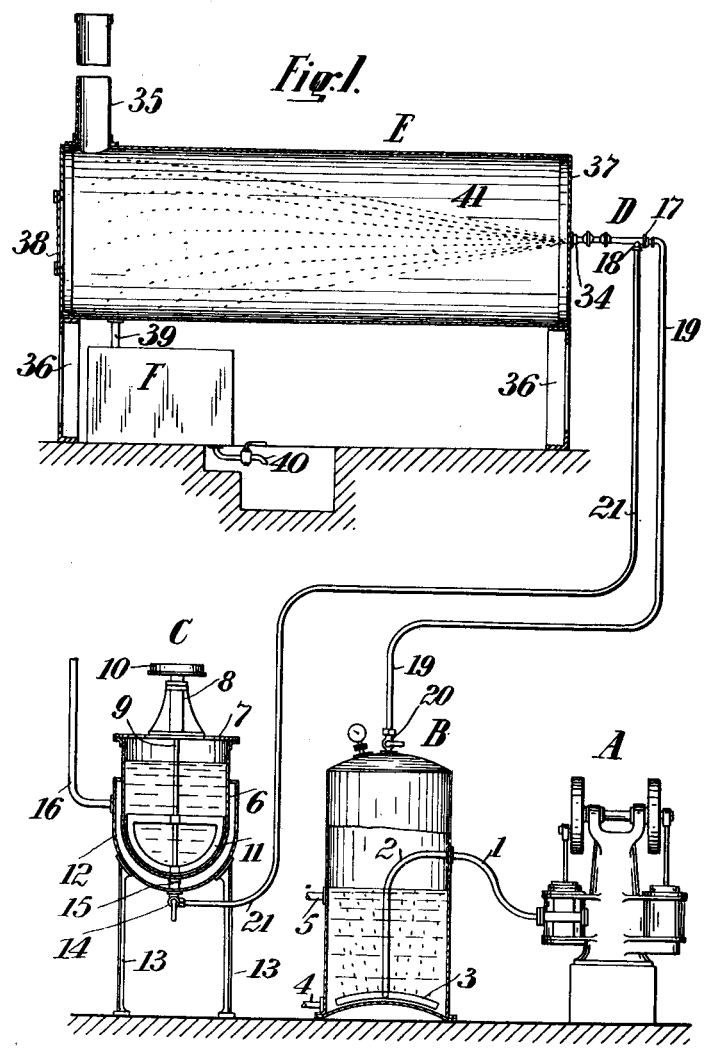

A. H. RASCHE.
METHOD OF RESTORING COAGULATED ALBUMINS TO THE ORIGINAL STATE.
APPLICATION FILED DEC. 9, 1912.

1,076,232.

Patented Oct. 21, 1913.

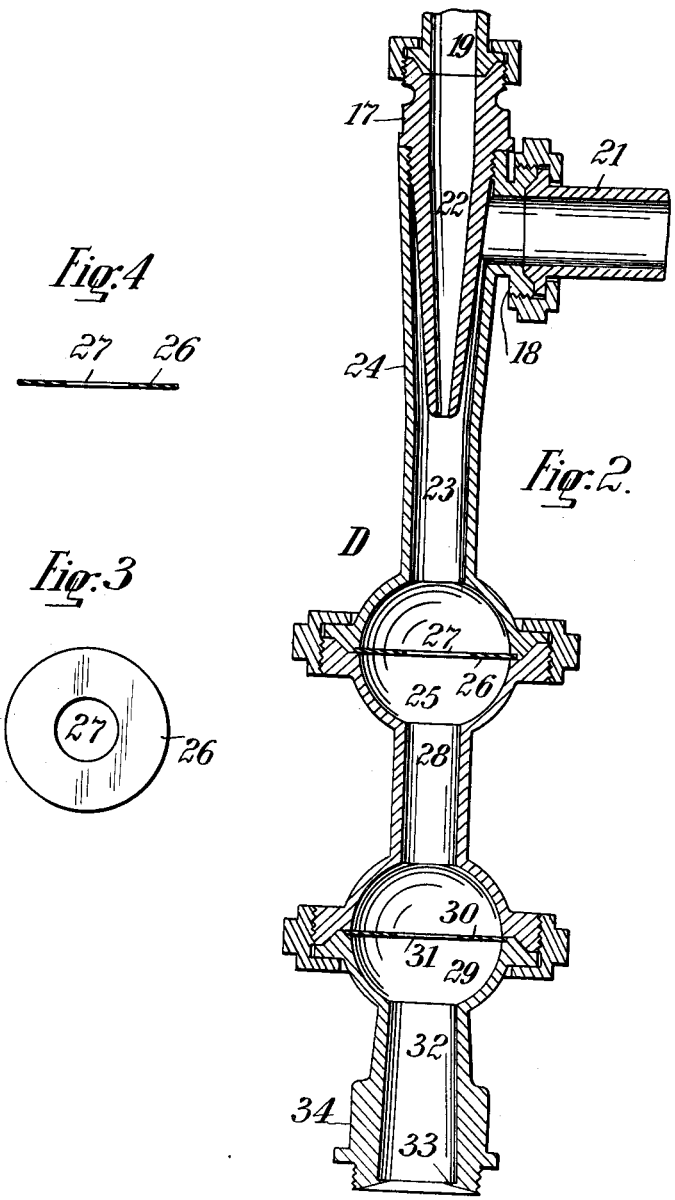

UNITED STATES PATENT OFFICE.

ALBERT H. RASCHE, OF CHARLOTTENBURG, GERMANY.

METHOD OF RESTORING COAGULATED ALBUMINS TO THE ORIGINAL STATE.

1,076,232.   Specification of Letters Patent.   Patented Oct. 21, 1913.

Application filed December 9, 1912.  Serial No. 735,821.

*To all whom it may concern:*

Be it known that I, ALBERT H. RASCHE, a citizen of the Empire of Germany, residing at Charlottenburg, Berlin, in the Empire of Germany, have invented a new and useful Method of Restoring Coagulated Albumins to the Original State, of which the following is a specification.

As is well known, albumins and albuminous bodies are coagulated on being heated to temperatures above 80° C., for example, such substances as lactalbumin and many other albumins. For this reason, many articles of food and drink are liable to be changed upon heating, and under other circumstances, and even may become unwholesome. For example, upon heating milk to a temperature above 80° C. certain of the albuminous substances therein, for example, lactalbumin, are precipitated and the digestive properties of the milk are impaired and the heated or boiled milk cannot be used for the manufacture of cheese, and the cream therefrom cannot be whipped by the usual method. Unfermented grape juice, when heated, becomes less fit for the manufacture of wine, on account of the precipitation of certain proteids therein. However, heating is desirable in connection with certain articles of food and drink, in order to destroy certain bacteria and other living organisms therein.

My invention relates to a method of restoring coagulated albumins and albuminous bodies to the original state. The coagulated albumins and albuminous bodies may be dried or they may be contained in liquids or emulsions. When in dry form, the coagulated albumins or albuminous bodies will require to be first mixed with a liquid to form an emulsion for further treatment.

My method consists in heating and agitating the liquid or emulsion containing coagulated albumins or albuminous bodies, supersaturating the heated liquid or emulsion with compressed gas, and in atomizing the warm liquid or emulsion while supersaturated with compressed gas so as to liquefy the coagulated albumins without, however, destroying the original or correct composition of the liquid. The resulting liquid will then show the same properties as a liquid, the albumins or albuminous bodies of which have not coagulated.

I will now proceed to describe my invention with reference to the accompanying drawings, in which—

Figure 1 is a diagram of a plant for carrying into effect the new method, Fig. 2 is a longitudinal section through an atomizer employed in this plant, and Figs. 3 and 4 show in elevation and cross section one of the two annular baffle-plates contained in this atomizer.

Similar letters of reference refer to similar parts throughout the several views.

A in Fig. 1 denotes a compressor of any known construction, which is adapted to suck from any known source (not shown) some indifferent gas, to compress this gas up to a certain pressure and to deliver the compressed gas through a tube 1 to a gas-washer B of any known construction. Preferably the indifferent gas should be preliminarily cleaned in any known manner, before it is supplied to the compressor A.

The gas-washer B is a closed vessel partly filled with some liquid (water for instance), which is admitted through a tube 4 and is discharged through another tube 5. The vessel B is provided with a tube 2 connected with the tube 1 above and with perforated tubes 3 below, so that the compressed gas passing upward from the perforated tubes 3 through the liquid is finally washed.

C is a heater consisting of a heating vessel 6, a top 7 with a bearing 8, a shaft 9 with a driving pulley 10 above and an agitator 11 below, a steam jacket 12 inclosing the greater part of the vessel 6 and suitable legs 13 for supporting the whole. The top 7 may be open or closed as circumstances render it advisable. The liquid containing the coagulated albumins or albuminous bodies or the dry coagulated albumins or albuminous bodies and the liquid intended to be therewith mixed are introduced into the vessel 6 through openings of the top 7 or through a suitable valved tube (not shown), as the case may be. The agitator 11 may be of any known construction and should be capable of forming a suspension from the dry coagulated albumins or albuminous bodies and the liquid added thereto. At the bottom the vessel 6 is provided with a suitable valve 14. Steam is supplied to the jacket 12 through a suitable tube 16 and the condensed water is to be discharged through a tube (not shown) at the bottom of the jacket.

D is an atomizer, for which I am about to apply for a patent of the United States. Its construction is illustrated in Figs. 2 to 4. The atomizer has two tubular connections 17 and 18, of which one 17 is to be connected with the gas-washer B by means of a tube 19 and a valve 20, and the other connection 18 is to be connected with the valve 14 by means of a tube 21. On opening the two valves 20 and 14 compressed, cleaned gas will pass from the vessel B through the tube 19 and a nozzle 22 (Fig. 2) of the atomizer and enter in a spreading jet a mixing chamber 23 formed by a part 24 of the casing surrounding the nozzle, so that the jet will suck in heated liquid or emulsion from the heating vessel 6 of the heater C through the tube 21 and will mix with the liquid or emulsion. In the atomizer D the liquid or emulsion is to be thoroughly mixed and saturated with the compressed gas. The atomizer D is shown to have two globular chambers 25 and 29, of which one 25 adjoins the mixing chamber 23 and is separated from the other globular chamber 29 by a cylindrical channel 28 having about the same inside diameter as the mixing chamber 23 in proximity of the first globular chamber 25. The left end 34 of the atomizer D in Fig. 1 contains a chamber 32, which slightly diverges outward from the second globular chamber 29 and is at the end suddenly narrowed by an annular inner projection 33 of a wedge-shaped cross section. The first globular chamber 25 is in its middle divided by an annular baffle-plate 26 (Fig. 3) having the opening 27. The second globular chamber 29 is in a similar manner divided by an annular baffle-plate 30 having the opening 31. The two openings 27 and 31 may have about the same diameter as the channel 28. It is obvious, that the jet leaving the mixing chamber 23 will be compelled to suddenly spread in the first half of the globular chamber 25, so that the liquid or emulsion will be more intimately mixed with the compressed gas, before the mixture passes on through the opening 27 of the baffle-plate and enters the second half of the chamber 25. Here the mixing is repeated whereupon the mixture passes through the cylindrical channel 28 and enters the first half of the second globular chamber 29, where the mixing of the constituents of the mixture is repeated and intensified. The mixture then passes through the opening 31 of the baffle-plate 30 and enters the second half of the globular chamber 29 to be further mixed, before it passes through the slightly diverging chamber 32. The number of the globular mixing chambers 25, 29, may be increased or decreased, as circumstances render it advisable.

E in Fig. 1 denotes a vessel, into which the liquid is atomized, which may be cylindrical and closed, except that it is provided with a vertical gas outlet 35. The vessel E may be supported by suitable supports 36. The atomizer D described above is to be attached with its end 34 to the center of the front 37 of the vessel E. A man hole cover 38 may be provided for cleaning the interior. A tube 39 is provided at the bottom of the vessel E and leads into a reservoir F, which may be provided with a valve 40. The atomizing vessel E is shown as horizontal, but it may be inclined or placed vertically.

The mixture leaving the slightly diverging chamber 32 of the atomizer D will enter the vessel E in a spreading jet 41. The annular inner projection 33 of the atomizer may assist in further atomizing the mixture and in spreading the jet. It is essential, that the particles of the liquid or emulsion do not dash on the walls of the vessel E, in other words they meet the walls under no great velocity but softly fall on the lower side of this vessel. The treated liquid is allowed to escape through the tube 39 into the reservoir F, from whence it can be drawn off through the valve 40. The expanded gas is allowed to escape through the discharging tube 35 into the atmosphere. For example the tube 19 for supplying compressed gas to the atomizer D may have 10 millimeters inner diameter, the tube 21 for supplying liquid or emulsion may have 13 millimeters inner diameter, the atomizing vessel E may have a diameter of one meter and a length of three or four meters, and the discharging tube 35 may be 400 by 200 millimeters in cross section and about 8 meters high. However, I do not bind myself in any way to these measures, but reserve to me the right of altering them in accordance with the circumstances.

In case dry coagulated albumins or albuminous bodies together with a liquid are introduced into the heater C, the agitator 11 should be capable of finely distributing the albumins in the liquid, so that the albumins and albuminous bodies are maintained for a long time suspended in the liquid, in other words they form an emulsion or suspension. The mixture discharged from the atomizer D into the atomizing vessel E should be atomized under such a pressure, that with the exception of the albumins the liquid present is not materially altered as regards its composition. It is essential for the plant illustrated, that the coagulated albumins or albuminous bodies be restored to their original state, in other words they are liquefied. For the formation of the emulsion any liquid may be utilized, which under the circumstances of the case remains liquid and does not stiffen or evaporate. For example water, oil, a mixture of water and oil, and the like, may be utilized. When the coagulated albumins are already contained in a liquid, of course the special preparation of the emulsion is not necessary. For example boiled milk can be at once introduced into the heater C without further addition of any liquid. It is only necessary not to increase the pressure to a degree sufficient to pulverize the fat present in the milk, in other words to homogenize the milk.

The indifferent gas employed for the atomization of the liquid or emulsion may be for example air or carbonic acid. For effecting the atomization it is advantageous to first supersaturate the liquid or emulsion with the gas and then to atomize the mixture, since the maximum effect of relaxation by reducing the pressure to about atmospheric pressure is thereby obtained. The quantity of compressed gas to be employed depends upon the quantity of the liquid used, also upon the temperature maintained. The pressure should be made as high as possible, in order to obtain by the atomization as fine a division as possible of the albumins and albuminous bodies and of the liquid without, however, increasing the pressure so much as to destroy also the liquid in its composition. When for example boiled milk is to be treated, it can be at once introduced into the heating vessel 6 and therein heated up to a temperature above 80° centigrade. The pressure in the gas-washer B should be so adjusted by means of a gage shown and other devices not shown, that the compressed gas (in this case air) leaves the mouth of the nozzle 22 in Fig. 2 under a pressure of 5½ or 6 atmospheres (atmospheric pressure excluded). The higher the temperature of the milk, the higher should the pressure be. On leaving the atomizer D the mixture will have a temperature of about 20° or 25° centigrade, which temperature may be reduced to below 10° centigrade in the atomizing vessel owing to the expansion of the jet. The higher the pressure is, the greater will be the expansion and the cooling.

The milk treated according to my method will show the same properties as fresh milk, so that it can be employed for the manufacture of whipped cream, butter and cheese.

Sterilized juices of fruit, beers, musts, and the like can also be treated in the plant illustrated and in accordance with my method for restoring their original properties. For example sterilized unfermented juice of grape containing coagulated albumins or albuminous bodies will be rendered fit for the manufacture of wine.

What I claim, is:—

1. The herein described method of restoring coagulated albumins to the original state, which consists in mixing dry coagulated albumins or albuminous bodies with a liquid, heating and agitating the mixture so as to form an emulsion, supersaturating the heated emulsion with a chemically indifferent gas under pressure, and atomizing the warm emulsion supersaturated with a chemically indifferent gas under pressure so as to bring said albumins or albuminous bodies into solution.

2. The herein described method of restoring coagulated albumins to the original state, which consists in heating and agitating a liquid containing coagulated albumins or albuminous bodies, supersaturating the heated liquid with a chemically indifferent gas under pressure, and atomizing the warm liquid supersaturated with a chemically indifferent compressed gas so as to bring said albumins or albuminous bodies into solution.

3. A method of rendering coagulated albumins soluble which comprises treating a liquid containing said albumins in an undissolved condition with a chemically indifferent gas under pressure, under conditions to supersaturate said liquid with said gas, and thereafter atomizing said liquid by means of a chemically indifferent gas under pressure, into an open vessel.

4. A method of rendering the coagulated albuminous substances of heated milk soluble, which comprises supersaturating said heated milk with a chemically indifferent gas under considerable pressure, and atomizing said milk by means of a chemically indifferent gas under pressure, and causing said milk and gas to flow past obstructions, into an open vessel.

ALBERT H. RASCHE.

Witnesses:
WOLDEMAR HAUPT,
HENRY HASPER.

Copies of this patent may be obtained for five cents each, by addressing the "Commissioner of Patents, Washington, D. C."